April 28, 1970 R. HAFLE 3,509,562

ANALOG TO DIGITAL ENCODER

Original Filed July 27, 1964 7 Sheets-Sheet 1

Inventor:
Ralph Hafle
By: Stone, Nierman, Burmeister & Zimmer
Attorneys

ANALOG TO DIGITAL ENCODER

Inventor:
Ralph Hafle
By: Stone, Nierman,
Burmeister & Zummer
Attorneys

April 28, 1970 R. HAFLE 3,509,562

ANALOG TO DIGITAL ENCODER

Original Filed July 27, 1964 7 Sheets-Sheet 3

Inventor:
Ralph Hafle
By: Stone, Nierman, Burmeister & Zummer
Attorneys

Inventor:
Ralph Hafle
By: Stone, Nierman,
Burmeister & Zummer
Attorneys

April 28, 1970 R. HAFLE 3,509,562

ANALOG TO DIGITAL ENCODER

Original Filed July 27, 1964 7 Sheets-Sheet 5

Inventor:
Ralph Hafle
By: Stone, Mierman, Burmeister & Gummer
Attorneys

April 28, 1970 R. HAFLE 3,509,562

ANALOG TO DIGITAL ENCODER

Original Filed July 27, 1964 7 Sheets-Sheet 6

Inventor:
Ralph Hafle
By: Stone, Mierman, Burmeister & Hyman
Attorneys

April 28, 1970 R. HAFLE 3,509,562

ANALOG TO DIGITAL ENCODER

Original Filed July 27, 1964 7 Sheets-Sheet 7

Inventor:
Ralph Hafle
By: Stone, Nierman,
Burmeister & Gummer
Attorneys

United States Patent Office 3,509,562
Patented Apr. 28, 1970

3,509,562
ANALOG TO DIGITAL ENCODER

Ralph Hafle, North Little Rock, Ark., assignor to The D. H. Baldwin Company, Cincinnati, Ohio, a corporation of Ohio Continuation of abandoned application Ser. No. 385,173, July 27, 1964. This application July 25, 1966, Ser. No. 584,636
Int. Cl. G08c 9/06; H03k 13/02
U.S. Cl. 340—347 20 Claims

ABSTRACT OF THE DISCLOSURE

An analog to digital encoder is disclosed employing a photoelectric transducer in the form of a code disc, light source and two sets of four photocells for producing two electrical waves varying sinusoidally at the same frequency responsive to rotation of the code disc and differing in phase by 90 electrical degrees. The electrical outputs of the transducer are then utilized to synthesize five sinusoidal waves differing in phase by increments of 36 electrical degrees, and these five waves are then converted into square waves and combined to form a train of pulses equally spaced in time and with a repetition rate equal to five times the frequency of the output of the transducer.

This application is a continuation of U.S. application Ser. No. 385,173, filed July 27, 1964, and now abandoned.

The present invention relates generally to devices for converting analog information to digital form, and more particularly to shaft angle encoders.

The angular position of a shaft may be encoded into a digital electrical output by rotating a disc responsive to the position of the shaft and generating from the disc an electrical signal which uniquely identifies the portion of the disc positioned on a reference plane passing through the shaft axis. At the present time, the most accurate mechanism for sensing the position of a rotatable disc is photoelectric. A photoelectric shaft angle encoder employs a disc with one or more coaxial tracks of alternate opaque and transparent sectors, each track being confronted by a photocell on one side of the disc, and a light source positioned on the other side of the disc. Photoelectric encoders are either of the incremental type or the code generating type. Incremental type encoders produce electrical pulses which are counted, and the magnitude of the counts is an indication of the angular displacement of the code disc from the reference plane. Code generating type encoders employ a plurality of coaxial tracks and produce an electrical signal from each of the tracks disposed on the reference plane at a particular time, and these signals represent a numerical value and locate the portion of the disc on the reference plane. The present invention may be utilized with both types of photoelectric encoders, and also has utility with other types of disc encoders.

A complete revolution of the code disc of an incremental type encoder will produce a fixed number of electrical pulses, and in photoelectric incremental encoders the number of pulses produced will be equal to the number of transparent sectors of the coaxial track of the code disc. It is an object of the present invention to provide an incremental type encoder which will produce more electrical output pulses than transitions built into the code disc.

Patent No. 2,986,726 of Edward M. Jones dated May 30, 1961, describes a photoelectric encoder of the code generating type which produces more digits in its output than tracks on the code disc. The photoelectric encoder of the Jones patent generates a five digit code from a single track of the code disc and adds this code to the code generated from a plurality of other tracks of the code disc to produce a vernier type electrical output from the code disc. It is an object of the present invention to provide a photoelectric analog to digital encoder which will generate a code with any number of digits from a single coaxial track of a code disc and is not limited by the number of transitions of the code disc.

Prior to the present invention, it has been necessary to correlate the number of transparent and opaque sectors of the most finely divided track of a code disc with the mechanical accuracy of the encoder in order to produce an encoder of optimum resolution. In accordance with the teachings of the present invention, however, the mechanical accuracy of the encoder may be used to an advantage even though the number of transitions of the code disc are less than the permissible resolution of the encoder established by mechanical considerations.

Mechanical considerations have limited the number of transitions in the form of opaque and transparent sectors which may be formed on a photographic plate. The above referred to patent of Jones indicates that a sixteen digit photoelectric binary code disc employs 65,536 transparent and opaque sectors, and that such disc requires a diameter of nearly sixteen inches. While techniques for producing photoelectric code discs have improved since 1957, the filing date of the above referred to Jones patent, it is still true that relatively large diameters are required to provide code discs with large numbers of transistions. In accordance with the present invention, any given electrical output may be obtained from a disc type encoder with a smaller diameter code disc than necessary for that output prior to the present invention.

It is also an object of the present invention to provide a photoelectric analog to digital encoder capable of resolving one second of arc. It is to be noted that the above referred to patent of Jones describes a construction achieving a resolution of one and one-quarter seconds of arc.

These and further objects of the present invention will be more readily apparent by reference to the following description taken in conjunction with the accompanying drawings, in which.

Figure 1:
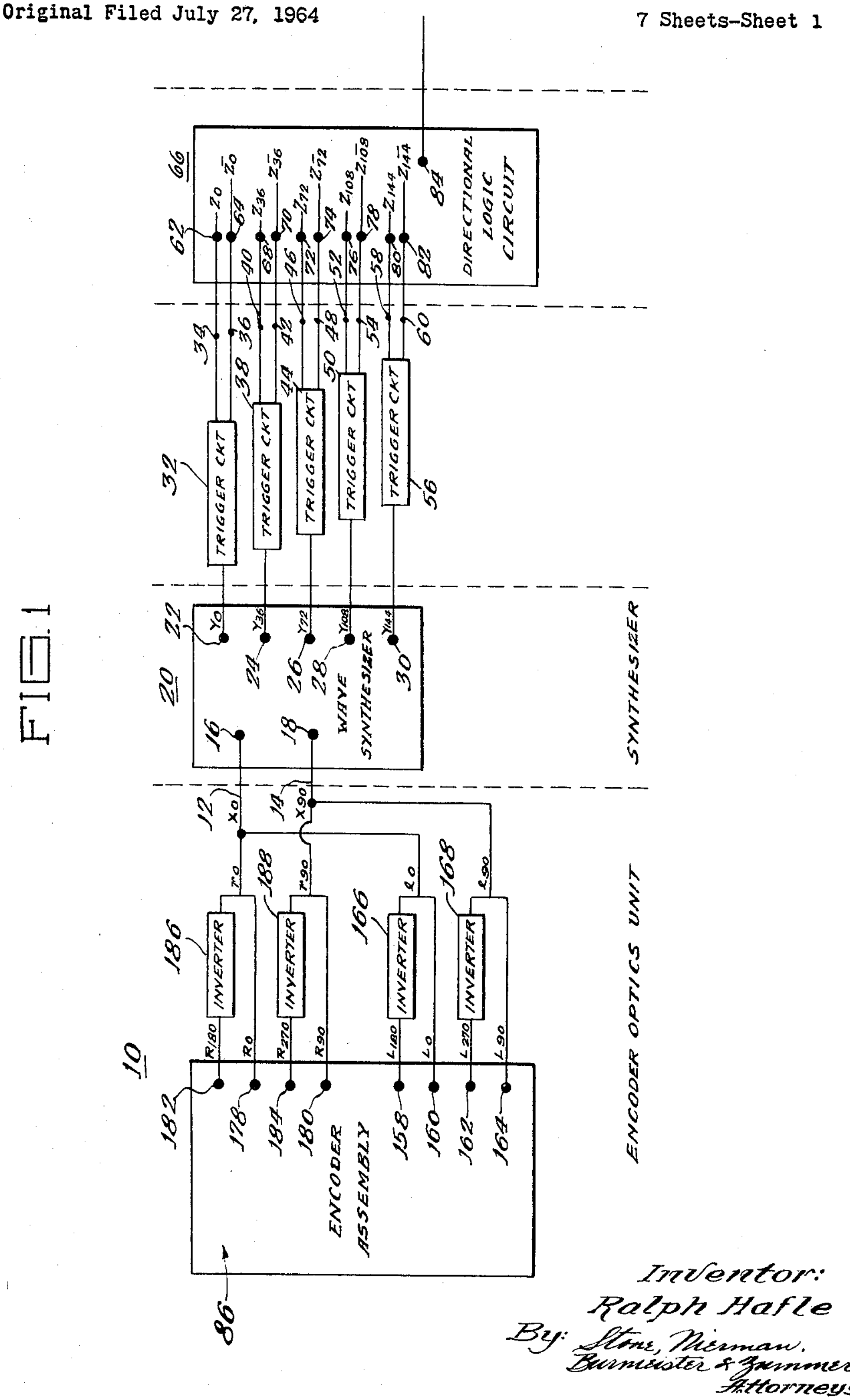
FIGURE 1 is a block electrical circuit diagram of an incremental encoder constructed according to the teachings of the present invention.

The incremental encoder illustrated in the block diagram of FIGURE 1 has an encoder optics unit 10 which produces on two output terminals 12 and 14 two electrical waves of the sinusoidal type which are phase displaced by 90°. These two output terminals 12 and 14 are connected to two input terminals 16 and 18 of a wave synthesizer 20, and the wave synthesizer 20 has five output terminals designated 22, 24, 26, 28, and 30. The wave synthesizer 20 produces five waves of the sinusoidal type from the two waves impressed at its input and these five waves appear on the output terminals 22, 24, 26, 28, and 30. The five waves are of identical amplitude and frequency, but phase displaced by equal increments of 36°. In the particular construction herein described, the electrical output on terminal 22 is the same as that impressed on input terminal 16, and has been designated $Y_o$. The output on terminal 24 is designated $Y_{36}$ to indicate that it is 36° ahead of the output $Y_o$. In like manner, the output on terminal 26 is designated $Y_{72}$ to indicate that it leads output $Y_o$ by 72°, the output on terminal 28 is designated $Y_{108}$ to indicate that it leads output $Y_o$ by 108°, and the output on terminal 30 is designated $Y_{144}$ to indicate that it leads output $Y_o$ by 144°.

Figure 3:
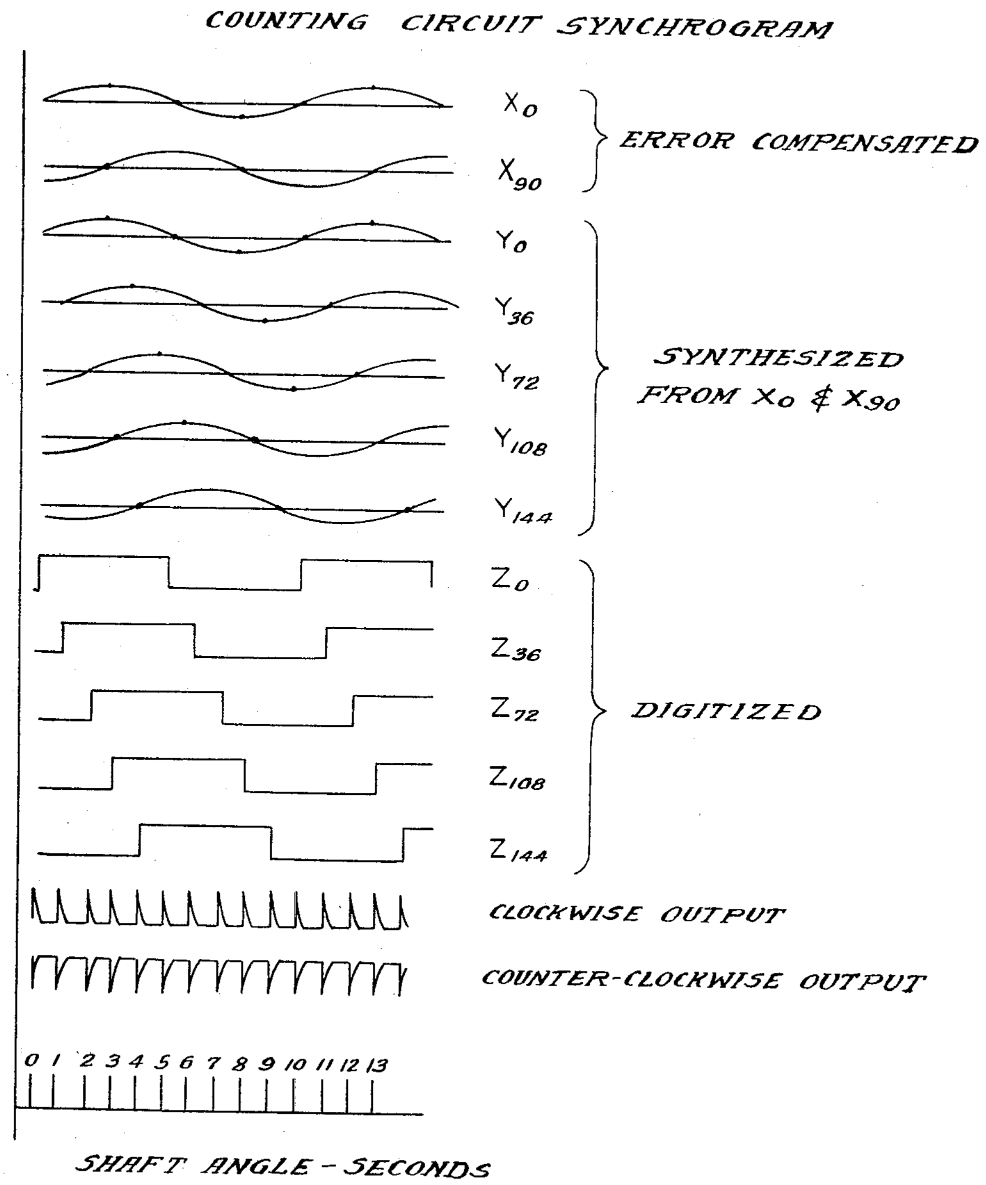
FIGURE 3 is a graph illustrating the correlation between the electrical wave forms of the incremental encoder shown in the block diagram in FIGURE 1 and the shaft angle in seconds of arc.

FIGURE 3 illustrates the form of the electrical waves appearing on the output terminals 12 and 14 of the encoder optics unit 10, and these wave forms have been designated $X_0$ and $X_{90}$ to indicate that the phase of the two waves differ by 90°. FIGURE 3 also indicates the form of the electrical waves $Y_0$, $Y_{36}$, $Y_{72}$, $Y_{108}$, and $Y_{144}$ appearing on the output terminals 22, 24, 26, 28, and 30 of the wave synthesizer 20.

A trigger circuit 32 is connected to the output terminal 22 of the wave synthesizer 20 and produces from the sinusoidal wave $Y_0$ a square wave also designated $Y_0$. The trigger circuit 32 also produces a second square wave output which is the inverse of the square wave $Y_0$ and is designated $\overline{Y}_0$. The $Y_0$ output of trigger circuit 32 appears on an output terminal 34, and the $\overline{Y}_0$ output appears on an output terminal 36.

The output terminal 24 of the wave synthesizer is connected to the input of a trigger circuit 38 which has output terminals 40 and 42. The wave $Y_{36}$ appears at the output terminal 24 of the wave synthesizer 20, and is seen to be a sine wave from FIGURE 3, and this wave is converted to the square wave $Y_{36}$ at the terminal 40, and the square wave $\overline{Y}_{36}$ at the terminal 42. The wave $\overline{Y}_{36}$ is the inverse of the wave $Y_{36}$. In like manner, output terminal 26 of the wave synthesizer 20 is connected to a trigger circuit 44 which has output terminals 46 and 48. Output terminal 28 of the wave synthesizer 20 is connected to the input of a trigger circuit 50 which has output terminals 52 and 54. Output terminal 30 of the wave synthesizer 20 is connected to the input of a trigger circuit 56 having output terminals 58 and 60. The trigger circuit 44 converts the sine wave $Y_{72}$ to square wave $Y_{72}$ and the inverse thereof $\overline{Y}_{72}$. The trigger circuit 50 converts the sine wave $Y_{108}$ to square wave $Y_{108}$ and the inverse thereof $\overline{Y}_{108}$. Trigger circuit 56 converts the sine wave $Y_{144}$ to square wave $Y_{144}$ and the inverse thereof $\overline{Y}_{144}$.

The output terminals 34 and 36 of the trigger circuit 32 are connected to input terminals 62 and 64 of a directional logic circuit 66. In like manner, output terminals 40 and 42 of trigger circuit 38 are connected to input terminals 68 and 70 of the directional logic circuit 66, and output terminals 46 and 48 of trigger circuit 44 are connected to input terminals 72 and 74 of the directional logic circuit 66. Also, output terminals 52 and 54 of trigger circuit 50 are connected to input terminals 76 and 78 of the directional logic circuit 66, and output terminals 58 and 60 of the trigger circuit 56 are connected to input terminals 80 and 82 of the directional logic circuit 66. The directional logic circuit has an output terminal 84 which receives a series of positive pulses for clockwise rotation of the code disc of the encoder optics unit 10, as indicated in FIGURE 3, and also, the output terminal 84 receives negative pulses for counterclockwise rotation of the code disc. It is also to be noted from FIGURE 3, that rotation of the code disc in either the clockwise or counterclockwise direction will produce a pulse of either positive or negative sign depending upon direction for each second of arc through which the code disc is rotated.

Figure 4:
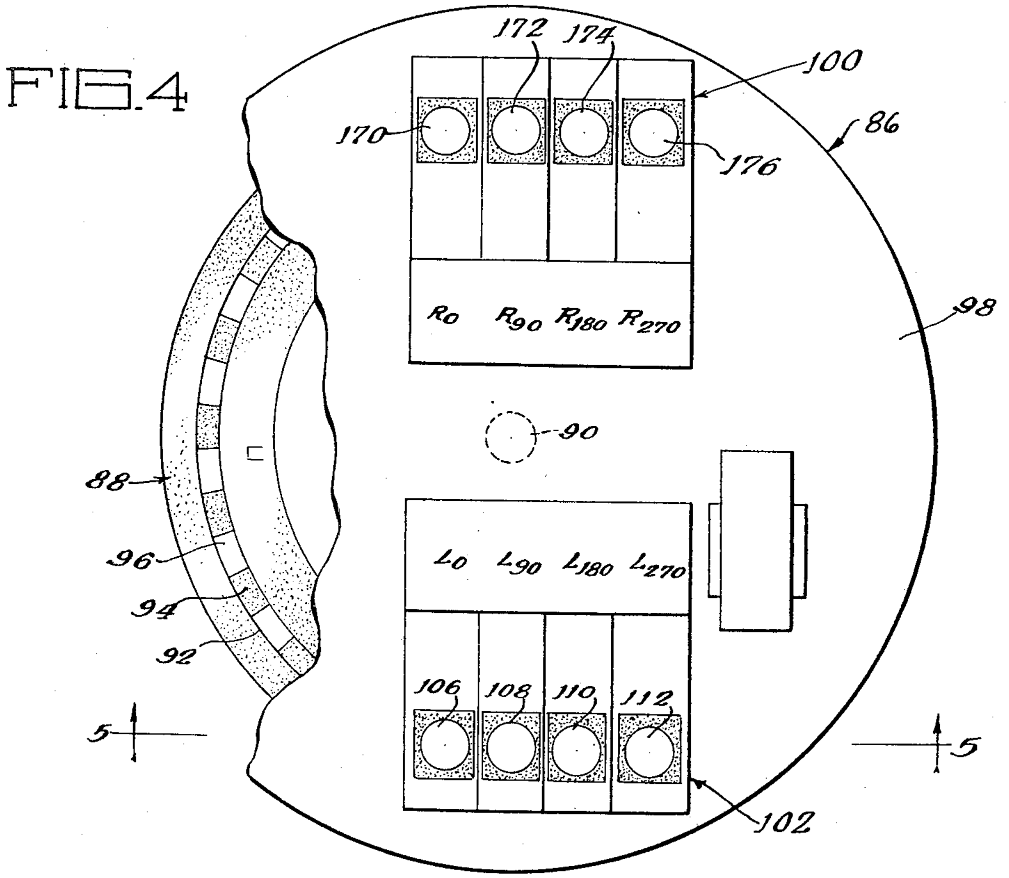
FIGURE 4 is a somewhat schematic view of the code disc and pulse generating equipment referred to as the encoder optics unit in FIGURE 1.
Figure 5:
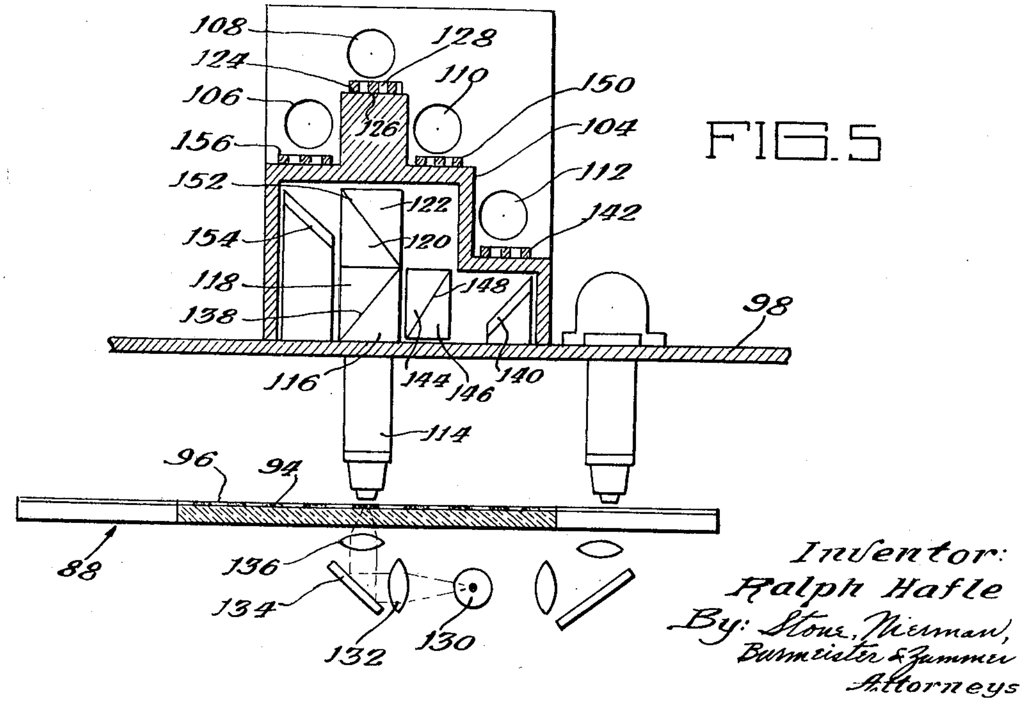
FIGURE 5 is a sectional view taken along the line 5—5 of FIGURE 4.

The encoder optics unit 10 has an encoder assembly 86 which is illustrated in FIGURES 4 and 5. In this assembly, a code disc 88 is rotatably mounted coaxially about a shaft 90, and it is the angular deviations of the shaft 90 which are measured. The code disc 88 has a circular track 92 comprising alternate opaque sectors 94 and transparent sectors 96. In FIGURE 4, the arc length of the sectors 92 and 94 is greatly exaggerated for purposes of clarity, for in the construction described throughout this application, the code disc 88 is provided with 129,600 lines, or transparent sectors 96 which are separated by opaque sectors 94 of equal arc length.

A mounting plate 98 is disposed above the code disc 88 and parallel thereto. Two photomultiplier assemblies 100 and 102 are mounted on the plate 98 for the purpose of generating the two sinusoidal waves, designated in FIGURES 3 as $X_0$ and $X_{90}$. Each of the photomultiplier assemblies 100 and 102 are of identical construction and employ a housing 104, illustrated in FIGURE 5, for the assembly 102. The housing 104 mounts four photomultiplier tubes 106, 108, 110, and 112 in position to receive a beam of light passing through a transparent sector 96 of the code discs 88 and through an optical system. The optical system employs an objective lens piece 114 which is focused on the track 92 of the disc 88 and magnifies the track 92 by a factor of 43. The beam of light focused by the objective lens piece 114 is impressed upon a series of four prisms, designated 116, 118, 120, and 122. The four prisms 116, 118, 120, and 122 are assembled in a rectangular column and transmit a portion of the light passing through the objective lens piece 114 through a grating 124 to the photocell 108 positioned directly above the objective lens piece 114. The grating 124 has a plurality of parallel opaque sectors 126 and transparent sectors 128 of equal width to that of the image of the track 88 produced by the optical system, these sectors 126 and 128 being illustrated in an enlarged form for clarity in FIGURE 5. When the transparent sectors 128 of the grating 124 are aligned with the lines of light transmitted through the track 92 of the code disc 88, light will impinge upon the photomultiplier 108.

A light source is positioned on the side of the code disc 88 opposite the photomultiplier housing 104 and includes a lamp 130. Rays of light from the lamp 130 are directed by a convex lens 132 on a mirror 134 which directs the beam of light from the lamp and lens through a second convex lens 136 onto the track 92 of the code disc 88. The light is focused on the disc 88.

The interface 138 between the prism 116 and 118 is half-silvered, and a portion of the light passing through the objective lens piece 114 is diverted by the interface 138 to a direction parallel to the plate 98. This portion of the light impinges upon a mirror or reflector 140 and is directed through a grating 142 to the photomultiplier tube 112. The grating 142 is identical to the grating 124 described above. The beam of light passing from the interface 138 to the reflector 140 passes through two prisms 144 and 146, and the interface 148 of these prisms 144 and 146 is also half-silvered and reflects a portion of this beam of light upwardly through a grating 150 on to the photomultiplier tube 110. The grating 150 is also identical to the grating 142. In like manner, a portion of the beam of light passing through the objective lens piece 114 and the prisms 120 and 122 is diverted from a half-silvered interface 152 between the prisms 120 and 122 onto a mirror surface 154 which reflects this portion of the light through a grating 156 to the photomultiplier tube 106.

The gratings 156, 124, 150, and 142 are displaced along the arc of the track 92 so that the photomultiplier tubes 106, 108, 110, and 112 produce four sinusoidal waves which are displaced from each other by increments of 90°. The photomultiplier tubes produce four electrical wave outputs from the encoder assembly 86 which appear on the output terminals 158, 160, 162, and 164. The photomultiplier tube 106 is electrically coupled to the output 160 and produces the output wave designated $L_0$ to indicate that this wave is from the left photomultiplier assembly 102 and is phased identical to the wave $X_0$. The photomultiplier tube 108 is electrically connected to the output terminal 164 and the wave from this photomultiplier tube is designated $L_{90}$ to indicate that it is 90° displaced from the output wave $L_0$. In like manner, photomultiplier tube 110 is electrically connected to the output terminal 158 and the wave from this photomultiplier tube is $L_{180}$, and the output of photomultiplier tube 112 is electrically connected to the terminal 162 and the wave from this photomultiplier tube is designated $L_{270}$. The output terminal 158 of the encoder assembly is connected to the output terminal 12 through an inverter 166. Since the electrical waves $L_0$ and $L_{180}$ are 180° out of phase, the inverter 166 transforms these waves to identical phase. In like manner, an inverter 168 is connected to the output terminal 162, and the output of the inverter 168 and the output from terminal 164 are connected to terminal 14 and constitute the $X_{90}$ output of the encoder optics unit 10.

The right hand photomultiplier assembly 100 is identical to that just described for the photomultiplier assembly 102, and has four photomultiplier tubes 170, 172, 174, and 176. The output of the photomultiplier tube 170 appears on a terminal 178 and the output of the photomultiplier tube 172 appears on a terminal 180. The output of photomultiplier tube 174 appears on terminal 182, and the output of photomultiplier tube 176 appears on terminal 184. An inverter 186 connects terminal 182 to output terminal 12, and a second inverter 188 connects output terminal 184 to output terminal 14. Terminal 178 is directly connected to terminal 12 and terminal 180 is directly connected to terminal 14.

It is to be noted that any change in the direct current level of the signals produced by the encoder assembly is cancelled out by subtracting the $R_{180}$ signal from the $R_0$ signal, subtracting the $R_{270}$ signal from the $R_{90}$ signal, subtracting the $L_{180}$ signal from the $L_0$ signal, and subtracting the $L_{270}$ signal from the $L_{90}$ signal. The phase inverters 186, 188, 166, and 168 are for this purpose. Further, mechanical errors, such as errors in centering of the code disc 68, are cancelled as a result of the use of two photomultiplier assemblies 100 and 102 positioned on opposite sides of the shaft 90. In addition, imperfections in an individual line of the code disc 88 are averaged out by use of the gratings 156, 124, 150, and 142, since a plurality of lines are impressed upon the photomultiplier tubes. The net result is that the terminals 12 and 14 at the output of the encoder optics unit are provided with two electrical waves $X_0$ and $X_{90}$ which are sinusoidal in form and of the same frequency, but differ in phase by precisely 90°.

Figure 6:
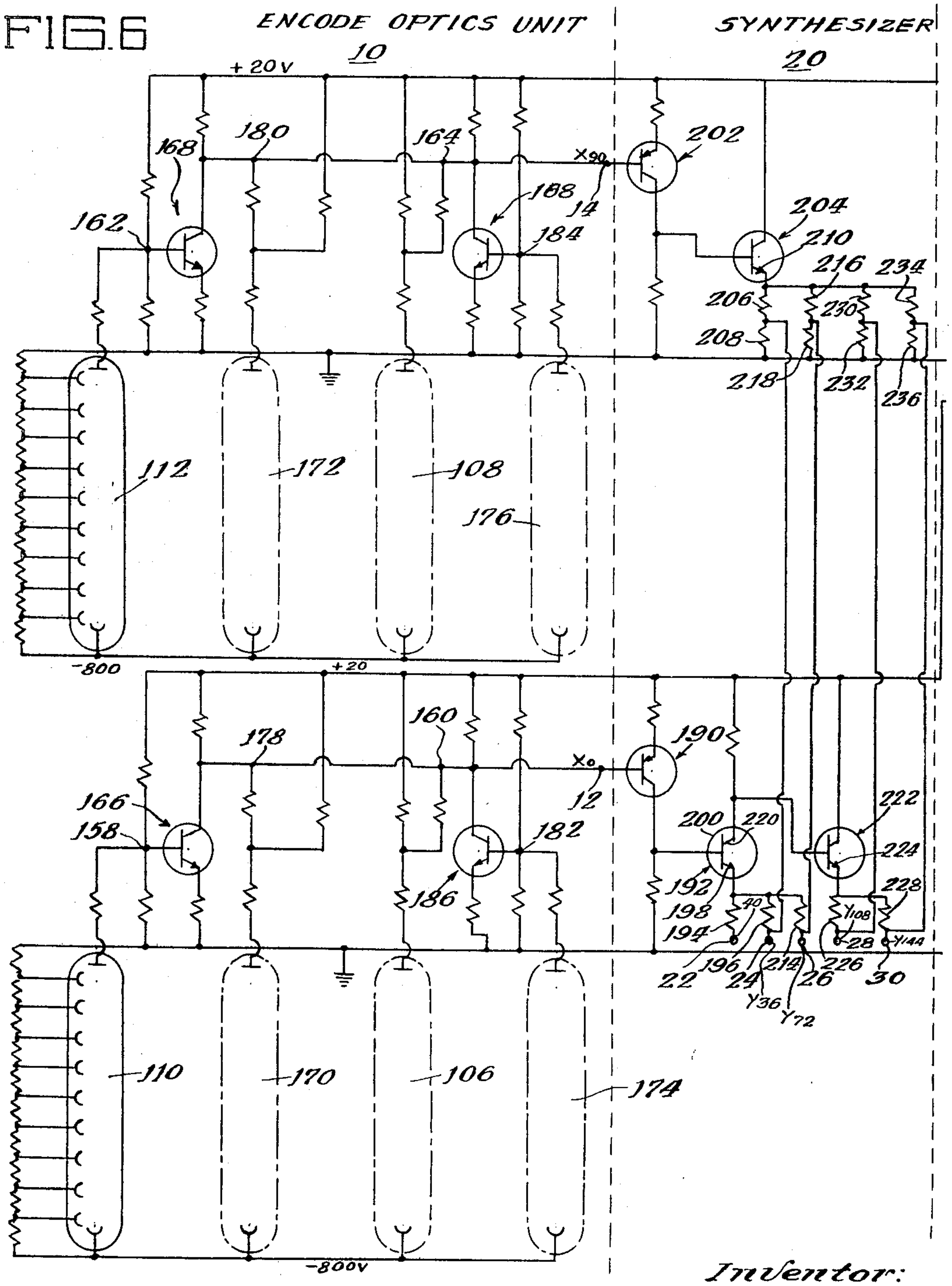
FIGURE 6 is a schematic electrical circuit diagram of the encoder optics unit and wave synthesizer portions of the incremental encoder illustrated in the block diagram in FIGURE 1.

The electrical circuit for the encoder optics unit 10 is illustrated in FIGURE 6, the terminal points in the circuit bearing the same reference numerals as illustrated in FIGURE 1. In addition, FIGURE 6 illustrates the electrical circuit for the synthesizer 20. The signal appearing on output terminal 12 of the encoder optics unit 10, $X_0$, may be expressed by the mathematical equation $X_0=K \sin wt$, and the output on terminal 14, $X_{90}$, may be expressed by the equation $X_{90}=K \sin(wt+\pi/2)$. By mixing these two signals in proper proportion any phase related signal of the form $C=K \sin(wt+B)$ can be synthesized. It may be shown that the new signal C follows the equation $$C=X_0 \cos B+X_{90} \sin B=K \cos B \sin wt+K \sin B \sin(wt+\pi/2)$$

where B is the new angle under consideration. Five signals are synthesized in the encoder here set forth. The signal $X_0$ is used as the $Y_0$ signal and has the form $$Y_0=K \sin (wt)$$

The other signals synthesized are:

$$Y_{36}=K \sin(wt+\pi/5)$$
$$Y_{72}=K \sin(wt+2\pi/5)$$
$$Y_{108}=K \sin(wt+3\pi/5)$$
$$Y_{144}=K \sin(wt+4\pi/5)$$

The resistor matrix used in the synthesizer is illustrated in FIGURE 6.

The $Y_0$ signal appears on terminal 22 and is taken from $X_0$ (terminal 12) through a transistor follower stage 190 and a transistor amplifier stage 192. The amplitude of the $Y_0$ signal is adjusted by means of a resistor 194 and the input impedances of the stages to which the $Y_0$ signal is connected. The $Y_{36}$ signal appears on terminal 24 and is taken from the $X_0$ wave through resistor 196 connected to the junction between the resistor 194 and the emitter 198 of the transistor 200 of the amplifier stage 192, and a portion of the $X_{90}$ wave of terminal 14 impressed on the $Y_{36}$ output by means of two transistor follower stages 202 and 204 connected in cascade. The follower stage 204 has two resistors 206 and 208 connected in series from the emitter 210 thereof, and the junction of the resistors 206 and 208 is connected to the $Y_{36}$ output terminal 24. The output $Y_{72}$ appears on terminal 26 as a combining portion of the $X_0$ wave from the amplifier stage 192 through the resistor 214, and a portion of the $X_{90}$ wave through the follower stage 204 and the resistors 216 and 218 connected in series, the junction of the two resistors 216 and 218 being connected to the $Y_{72}$ terminal 26.

It is to be noted that the $Y_0$, $Y_{36}$, and $Y_{72}$ outputs are all located at phases between the $X_0$ wave and the $X_{90}$ wave, but the other two outputs $X_{108}$ and $Y_{144}$ cannot be synthesized from the $X_0$ and $X_{90}$ waves since these outputs will not be located between the two waves. For this reason, the amplifier 192 is used as an inverter to transform the $X_0$ wave to $\overline{X}_0$. The $\overline{X}_0$ appears on the collector 220 of transistor 200, and is connected to a transistor follower 222 having an emitter 224 electrically connected to resistors 226 and 228. The output $Y_{108}$ appears on the resistor 226 and is a mixture of the $\overline{X}_0$ and the $X_{90}$ wave which is conducted from the emitter 210 of the follower 204 through a voltage divider comprising resistors 230 and 232. In like manner, the $Y_{144}$ output of the synthesizer appears on resistor 228 and is a mixture of the $\overline{X}_0$ wave and the $X_{90}$ wave which is conducted from the follower 204 through the voltage divider comprising resistors 234 and 236. It will be noted that in FIGURES 6 and 7, terminals carrying the designations $Y_0$, $Y_{36}$, $Y_{72}$, $Y_{108}$, and $Y_{144}$ are electrically interconnected, this convention being utilized to simplify the showing of the circuits.

Figure 2:
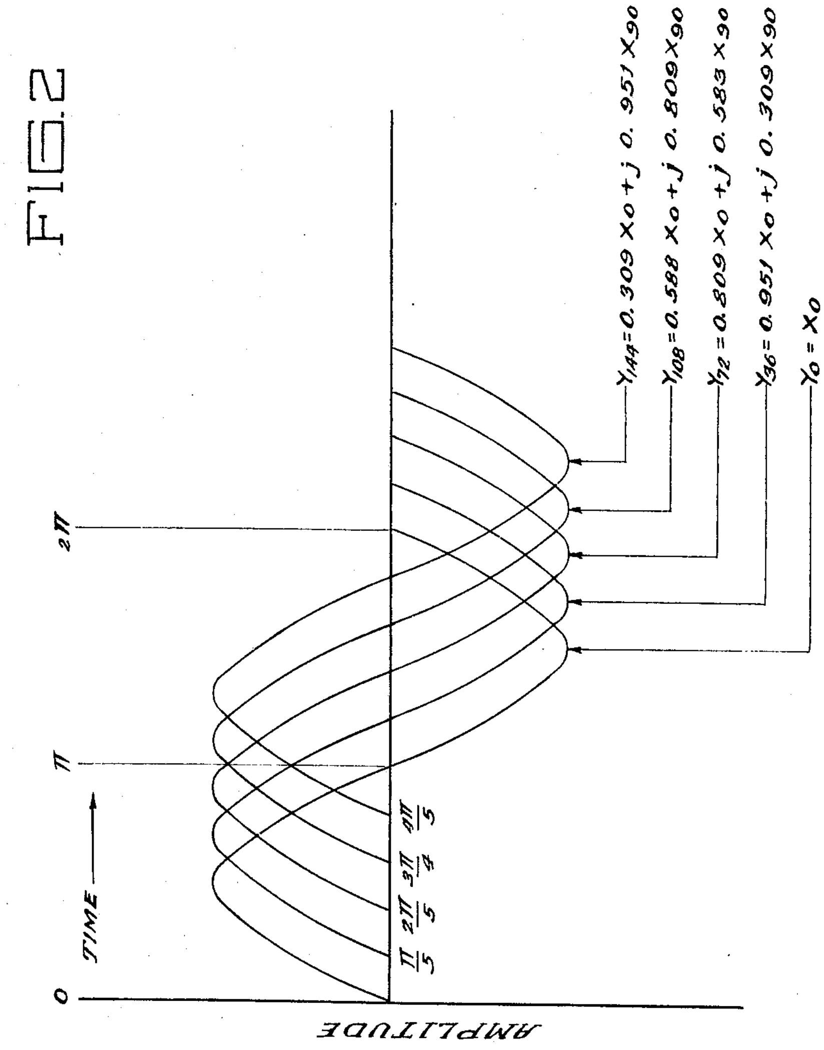
FIGURE 2 is a graph illustrating the form of electrical outputs from the synthesizer of FIGURE 1.

FIGURE 2 is a graph illustrating the five sine waves generated by the synthesizer 20 and set forth the equation for each of these waves. It is to be noted that the five sine waves produced by the synthesizer 20 are precisely related in phase so that transitions at the zero axis of the waves occur at equal time intervals for any constant shaft rotational rate.

A sine wave $Y_0$ is impressed upon the input terminal of a trigger circuit 238 which is responsive to transitions of the sine wave, $Y_0$ and produces a square wave illustrated in FIGURE 3 by the designation $Z_0$ on the output terminal of the trigger circuit 238, also designated $Z_0$. In like manner the inverse of the square wave $Z_0$, designated $\overline{Z}_0$, appears on a second output terminal of the trigger circuit 238 which is designated $\overline{Z}_0$. In like manner, the square wave $Z_{36}$ and the inverse of this square wave trigger circuit 240 which produces on one output terminal the square wave $X_{36}$ and the inverse of this square wave on a second output terminal designated $\overline{Z}_{36}$. In an identical manner, the sine wave $Y_{72}$ appearing at the output of the synthesizer 20 on terminal 26 is impressed on the input of a trigger circuit 242 which produces on separate output terminals the square wave $Z_{72}$ and the square wave $\overline{Z}_{72}$. The sine wave 108 appearing on the output terminal 26 of the synthesizer 20 is impressed on the input of a trigger circuit 244, and the trigger circuit 244 produces on separate output terminals square waves $Z_{108}$ and $\overline{Z}_{108}$. Finally, the sine wave $Y_{144}$ appearing on output terminal 30 of synthesizer 20 is impressed upon the input of a trigger circuit 246 which produces on separate output terminals the square waves $Z_{144}$ and $\overline{Z}_{144}$.

Figure 7:
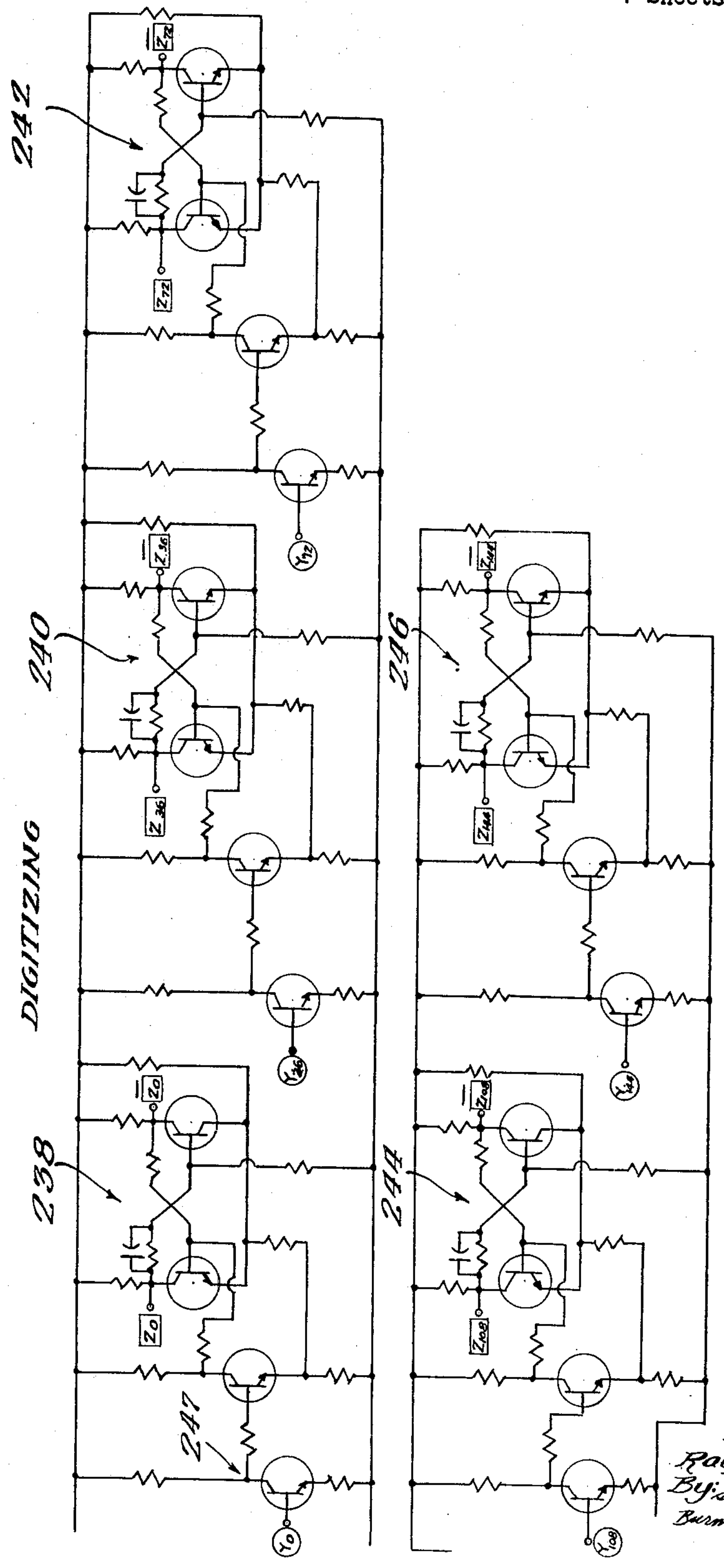
FIGURE 7 is a schematic electrical circuit diagram of the digitizing portion of the incremental encoder illustrated in FIGURES 1 through 6.

FIGURE 7 illustrates in detail each of the trigger circuits 238, 240, 242, 244 and 246. These trigger circuits all employ a transistor amplifier 247 at their inputs which presents a very low impedance so that the ratio of wave $X_{90}$ and $X_0$ which is utilized in the synthesizer 20 to produce the phase related sine waves $Y_0$, $Y_{36}$, $Y_{72}$, $Y_{108}$, and $Y_{144}$ is determined largely as a result of the resistors of the synthesizer 20. In other respects, the trigger circuits are conventional and will not be further described.

Figure 8:
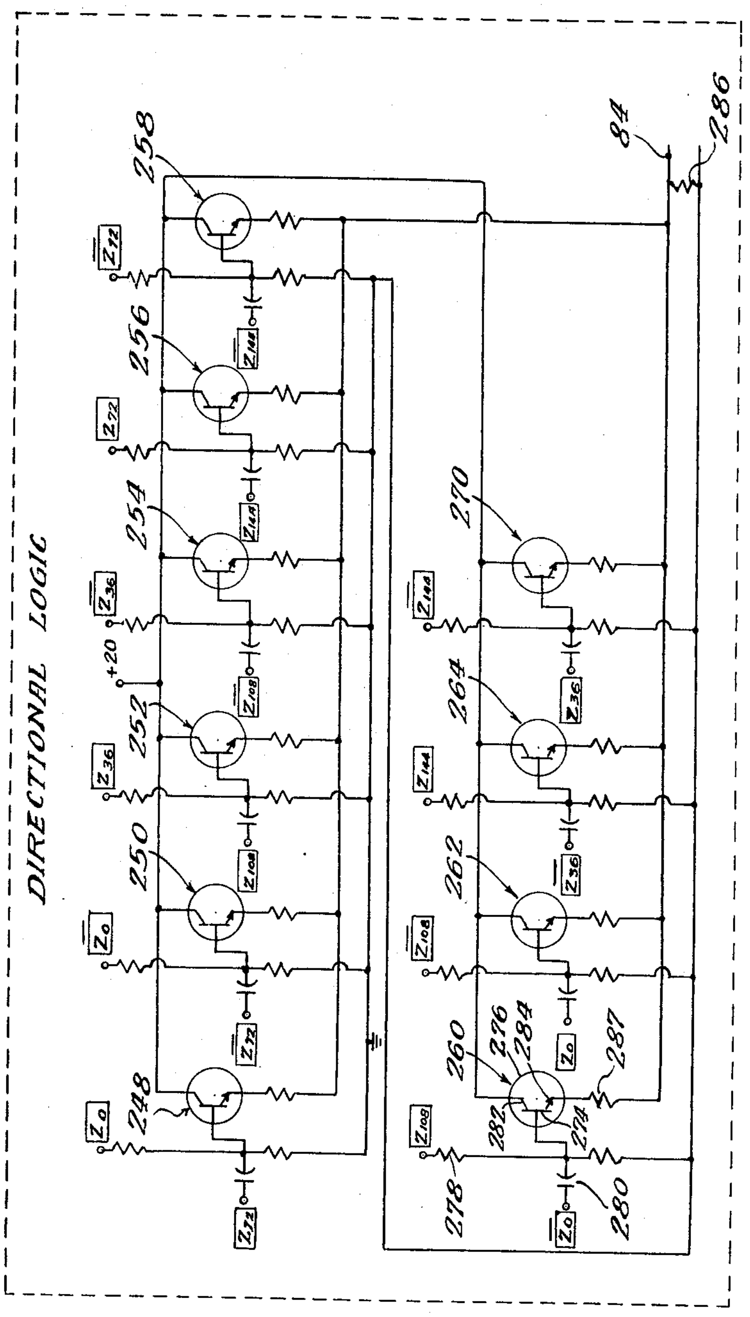
FIGURE 8 is a schematic electrical circuit diagram of the directional logic circuit illustrated in block diagram in FIGURE 1.

FIGURE 8 illustrates the directional logic circuits which are coupled to the outputs of the trigger circuits 238, 240, 242, 244, and 246, the input terminals of the directional logic circuits bearing the same designations as the output terminals of the trigger circuits to indicate interconnection of these terminals.

Every thirty-six electrical degrees, one of the ten square waves goes positive and one of the ten square waves goes negative simultaneously. The directional logic circuit comprises a series of ten gates which pass positive going pulses for clockwise rotation and negative going pulses for counterclockwise rotation. Each of the gates is controlled by the direct current level impressed thereon by a pulse seventy-two electrical degrees behind the signal producing the pulse.

In FIGURE 8, the ten gates circuits are designated 248, 250, 252, 254, 256, 258, 260, 262, 264, and 270. The gates all have a common output terminal 84 which receives the positive pulses relative to ground to indicate clockwise rotation and the negative pulses to indicate counterclockwise rotation.

Consider the operation of the gate circuit 260, which is typical of the ten gates circuits. The base 274 of transistor 276 of the gate 260 is electrically connected through a resistor 278 to the output $Z_{108}$ which appears on the second output terminal of the trigger circuit 244. As a result, the direct current level of the output terminal $Z_{108}$ of trigger circuit 244 is impressed upon the base 274 of transistor 276. The output $\overline{Z}_0$ which appears on the second output terminal of trigger circuit 238 is also impressed upon the base 274 through a capacitor 280. The collector 282 of the transistor 276 is connected to the positive terminal of a direct current source, the negative terminal being connected to ground and coupled to the emitter 284 of the transistor 276 through a resistor 286 which is common with all gates and a resistor 287.

The gate 260 is a common emitter transistor gate circuit, and will be cut off if the direct current bias on the base 274 is reversed, or negative as illustrated. Hence, when the wave $Z_{108}$ is in a negative condition at the time the pulse $\overline{Z}_0$ goes positive, the gate 260 will produce an output pulse. This will occur for clockwise rotation, since the positive going pulse produced by the wave $\overline{Z}_0$ and differentiated by the capacitor 280 occurs at a time when the wave $Z_{108}$ is in a negative condition. However, with this direction of rotation, the negative going pulses from the wave $\overline{Z}_0$ occur at a time when the wave $Z_{108}$ is in a positive condition, and therefore negative pulses are not passed by the gate. The same counter 260 will produce negative pulses for counterclockwise rotation since the negative going transitions of the wave $\overline{Z}_0$ which are differentiated by the capacitor 280 occur at times when the wave $Z_{108}$ is in a negative state. For counterclockwise rotation of the disc, positive going transistions of the wave $\overline{Z}_0$ occur at times when the wave $Z_{108}$ is positive, and hence produce no pulses. Each of the other trigger circuits operates in an identical manner, and the outputs are connected on a common output terminal. Therefore, for each transition of the code disc 88, ten pulses of either positive or negative sign depending upon direction of rotation appear on the output terminal 84.

It is to be understood that the pulses appearing on the output terminal 84 may be fed into a reversible counter so that a rotation of the code disc 88 will produce either ten counts to be added or subtracted by the counter for each transparent area. Further, it is to be understood that the synthesizer 20 may be utilized to synthesize more or fewer sinusoidal waves to multiply the number of transistions produced by the code disc 88 by a larger or smaller factor. Further, the encoder here disclosed utilizes both the leading and trailing edge of each square wave generated by the trigger circuits to produce two additional pulses for each synthesized sine wave. Unless the trailing edge of the pulses is accurately controlled, it is necessary to utilize only the leading edge of the wave, and the multiplication factor achieved by such a device would be the same as the number of waves synthesized, whereas in the present encoder twice as many pulses are produced as synthesized waves.

Those skilled in the art will readily devise many applications for the present invention beyond those here set forth. Further, those skilled in the art will readily perceive modifications of the present invention from that here disclosed. It is therefore intended that the scope of the present invention be not limited by the foregoing disclosure, but rather only by the appended claims.

The invention claimed is:

1. An analog to digital encoder comprising a transducer for generating two cyclical electrical wave outputs on two separate output terminals responsive to a change in a physical condition, said cyclical waves being of the same frequency and differing in phase by a fixed increment, the frequency of the electrical waves being a mathematical function of the rate of change of the condition, a synthesizer having two input terminals electrically connected to the two output terminals of the transducer for producing from said two electrical outputs more than two cyclical electrical signals on separate output terminals, said cyclical electrical signals being controlled as to frequency and phase by the transducer and being of the same frequency and differing in phase by equal increments, a plurality of pulse generators equal in number to the number of cyclical electrical signals, each pulse generator having an input terminal electrically connected to one of the output terminals of the means for producing electrical signals and an output terminal and producing a chain of pulses responsive to the frequency and phase of the electrical signal impressed on the input terminal thereof, and pulse train assembly means having a plurality of input terminals equal in number to the number of pulse generators and at least one output terminal, each of said input terminals of the pulse train assembly means being electrically connected to the output terminal of a different pulse generator, and said pulse train assembly means producing a train of pulses on each output terminal thereof with a frequency equal to a multiple of the frequency of the cyclical waves of the transducer.

2. An analog to digital shaft angle encoder comprising means for generating two cyclical electrical waves on two separate output terminals responsive to rotation of the shaft, said cyclical waves being of the same frequency and differing in phase by a fixed increment, the frequency of the electrical waves being a mathematical function of the rotation rate of the shaft, a synthesizer having two input terminals electrically connected to the two output terminals of said means for generating electrical waves for producing from said electrical waves more than two cyclical electrical signals on separate output terminals, said cyclical electrical signals being controlled as to frequency and phase by the electrical waves and being of the same frequency and differing in phase by equal increments, a plurality of pulse generators equal in number to the number of cyclical electrical signals, each pulse generator having an input terminal electrically connected to one of the output terminals of the means for producing electrical signals and an output terminal and producing a chain of pulses responsive to the frequency and phase of the electrical signal impressed on the input terminal thereof, and pulse train assembly means having a plurality of input terminals equal in number to the number of pulse generators and at least one output terminal, each of said input terminals of the pulse train assembly means being electrically connected to the output terminal of a different pulse generator, and said pulse train assembly means producing a train of pulses on each output terminal thereof with a frequency equal to a multiple of the frequency of the cyclical waves of the means for generating two cyclical wave outputs.

3. A photoelectric shaft angle encoder comprising the combination of claim 2 wherein the means for generating two cyclical electrical wave outputs responsive to rotation of the shaft comprises a code disc mounted coaxially on the shaft for rotation therewith, said disc having a circular track disposed thereon coaxially about the shaft having a plurality of transparent sectors of equal arc length separated by opaque sectors of equal arc length, a light source disposed on one side of the code disc for illuminating the disc, and two light responsive transducers disposed confronting different portions of the track on the side of the disc opposite the light source.

4. An analog to digital shaft angle encoder comprising the combination of claim 2 wherein the means for producing more than two cyclical electrical signals comprises a first group of resistors electrically connected at one end to one input terminal of the means for producing more than two cyclical electrical signals, each of said resistors of the first group being electrically connected at the other end to a different output terminal of said means, and a second group of resistors electrically connected at one end to the second input terminal of said means, each of the resistors of said second group of resistors being electrically connected to a different output terminal of said means, at each output terminal the resistor of the first group and the resistor of the second group mixing the two cyclical electrical waves of the generating means to produce a potential having a phase angle between that of the two cyclical electrical waves, and the phase angle of the signals on the output terminals of the means for producing more than two signals differing in phase from each other by 180 degrees divided by the number of output terminals of said means.

5. An analog to digital shaft angle encoder comprising the combination of claim 2 wherein the two cyclical waves generated by the means responsive to rotation of the shaft differ in phase by an angle no greater than 90 degrees wherein the means for producing more than two cyclical electrical signals comprises a first group of resistors electrically connected at one end to one input terminal of the means for producing more than two cyclical electrical signals, each of said resistors of the first group being electrically connected at the other end to a different output terminal of said means, a phase inverter having an input terminal electrically connected to the other input terminal of said means and an output terminal, and a second group of resistors equal in number to one less than the number of output terminals, each of said resistors being electrically connected at one end to a different output terminal and some of said second group of resistors being electrically connected at the other end to the other input terminal of said means, the remainder of said resistors of the second group being electrically connected at the other end to the output terminal of the phase inverter, and the phase angle of the signals on the output terminals of said means differing in phase from each other by 180 degrees divided by the number of output terminals,

6. An analog to digital shaft angle encoder comprising the combination of claim 2 wherein each of the pulse generators comprises a trigger circuit having a triggering threshold at the positive-negative transition of the input electrical signal thereto.

7. An analog to digital shaft angle encoder comprising the combination of claim 2 wherein the pulse train assembly means comprises a plurality of capacitors equal in number to the number of pulse generators, each capacitor being electrically connected at one end to the output terminal of a different pulse generating circuit, a plurality of gate circuits equal in number to the number of pulse generators, said gate circuits passing positive and negative pulses when open and no pulses when closed, each gate circuit having a first input terminal, an output terminal and a gate control terminal, the input terminal of each gate circuit being electrically connected to the other end of a different capacitor, and the output terminals of the gate circuits being electrically interconnected, and the control terminal of each gate being electrically coupled to the output of a pulse generator differing in phase from that coupled to the input terminal of said gate by less than 90 degrees, said gate being open for potentials on the control terminal of one sign and closed for potentials on said control terminal of opposite sign, whereby positive pulses appear on the output terminals of the gate circuits for rotation of the shaft in one direction and negative pulses for rotation of the shaft in the opposite direction.

8. An analog to digital shaft angle encoder comprising a code disc mounted coaxially on the shaft for rotation therewith, said disc having circular track disposed thereon coaxially about the shaft having a plurality of transparent sectors of equal arc length separated by opaque sectors of equal arc length, a light source disposed on one side of the code disc for illuminating the disc, an optical system disposed on the side of the disc opposite the light source and focused on the disc, said optical system producing a beam of light from a plurality of transparent sectors of the code, disc, a beam splitter disposed in the path of said beam of light deriving two subbeams therefrom, a photoresponsive device disposed in the path of each of said two subbeams for producing an electrical signal responsive to illumination, a grating having a plurality of transparent and opaque lines disposed on each of said two subbeams confronting the photoresponsive device, said gratings corresponding to the image of the code disc and being phase displaced from each other so that the electrical signals of the photoresponsive devices are phase displaced from each other, means having two input terminals electrically connected to the two photoresponsive devices for producing more than two cyclical electrical signals on separate output terminals, said cyclical electrical signals being controlled as to frequency and phase and being of the same frequency and differing in phase by equal increments, a plurality of transition responsive pulse generators equal in number to the number of cyclical electrical signals, each pulse generator having an input terminal electrically connected to one of the output terminals of the means for producing electrical signals and an output terminal, and pulse train assembly means having a plurality of input terminals equal in number to the number of pulse generators and at least one output terminal, each of said input terminals of the pulse train assembly means being electrically connected to the output terminal of a different pulse geenrator, and said pulse train assembly means producing a train of pulses on each output terminal thereof with a frequency equal to a multiple of the frequency of the electrical response of the photoresponsive means.

9. An analog to digital encoder comprising the combination of claim 8 wherein the electrical signals generated by the photoelectric device differ in phase by 90 electrical degrees.

10. An analog to digital encoder comprising the combination of claim 8 wherein four beam splitters are disposed in the path of the beam of light produced by the optical system producing four subbeams, a separate grating is disposed in each subbeam and each subbeam impinges on a photoresponsive device, each of said gratings being displaced from each other relative to the images at the gratings by equal increments of 180 degrees, whereby the first, second and third photoresponsive devices generate cyclical waves differing in phase by 90 degrees, 180 degrees and 270 degrees, respectively, relative to the electrical output of the fourth photoresponsive device, a first inverter electrically connected between the first photoresponsive device and the third photoresponsive device, and a second inverter electrically connected between the second photoresponsive device and the fourth photoresponsive device.

11. An analog to digital shaft angle encoder comprising a code disc mounted coaxially on the shaft for rotation therewith, said disc having a circular track disposed thereon coaxially about the shaft having a plurality of transparent sectors of equal arc length separated by opaque sectors of equal arc length, a light source disposed on one side of the code disc for illuminating the disc, a first pair and a second pair of photoresponsive devices disposed on the opposite side of the disc confronting the track, said first and second pairs of photoresponsive devices being disposed on opposite sides of the shaft, the first photoresponsive device of each pair confronting a different portion of the track than the second photoresponsive device of said pair and generating an electrical signal out of phase with that generated by the second photoresponsive device, and the first photoresponsive devices of the two pairs generating signals of the same phase and the second photoresponsive deivces of the two pairs generating signals of the same phase, means electrically interconnecting the first photoresponsive devices of the two pairs and means electrically interconnecting the second photoresponsive devices of the two pairs, means having two input terminals electrically connected to the first and second photoresponsive devices respectively for producing more than two cyclical electrical signals on separate output terminals, said cyclical electrical signals being controlled by the photoresponsive devices and being of the same frequency and differing in phase by equal increments, a plurality of pulse generators equal in number to the number of cyclical electrical signals, each pulse generator having an input terminal electrically connected to one of the output terminals of the means for producing electrical signals and an output terminal, and pulse train assembly means having a plurality of input terminals equal in number to the number of pulse generators and at least one output terminal, each of said input terminals of the pulse train assembly means being electrically connected to the output terminal of a different pulse generator, and said pulse train assembly means producing a train of pulses on each output terminal thereof with a frequency equal to a multiple of the frequency of the cyclical waves produced by the photoresponsive devices.

12. An analog to digital shaft angle encoder comprising the combination of claim 11 wherein two groups of four photoresponsive devices are disposed on each side of the shaft, each of said groups producing a separate cyclical electrical wave from each photoresponsive device, the first, second and third devices producing waves differing in phase by 90 degrees, 180 degrees and 270 degrees, respectively, to the output of the fourth photoresponsive device, means electrically interconnecting the first photoresponsive devices of the two groups to produce a first cyclical wave, means electrically interconnecting the second photoresponsive devices of the two groups to produce a second cyclical wave, four phase inverters, the first phase inverter electrically interconnecting the third and first photoresponsive devices of the first group, the second phase inverter electrically interconnecting the third and first photoresponsive devices of the second group, the third phase inverter electrically interconnecting the second and fourth photoresponsive devices of the first group, and the fourth phase inverter electrically interconnecting the second and fourth photoresponsive devices of the second group.

13. A subassembly for an analog to digital encoder comprising a transducer for generating two cyclical electrical wave outputs on two separate output terminals responsive to a change in a physical condition, said cyclical waves being of the same frequency and differing in phase by a fixed increment, the frequency of the electrical waves being a mathematical function of the rate of change of the condition, and a synthesizer having two input terminals electrically connected to the two output terminals of the transducer for producing more than two cyclical electrical signals from said two electrical waves on separate output terminals, said cyclical electrical signals being controlled and varied as to frequency and phase by the transducer, and said electrical signals being of the same frequency and differing in phase by equal increments for all valves of frequency, whereby each of said electrical signals may be utilized to digitize the output of the transducer.

14. A subassembly for an analog to digital encoder comprising the combination of claim 13 in combination with a plurality of pulse generators equal in number to the number of cyclical electrical signals, each pulse generator having an input terminal electrically connected to one of the output terminals of the means for producing electrical signals and an output terminal and producing a chain of pulses responsive to the frequency and phase of the electrical signal impressed on the input terminal thereof.

15. An analog to digital shaft angle encoder comprising the combination of claim 13 wherein the transducer is responsive to rotation of a shaft, the frequency of the electrical waves being a mathematical function of the rotation rate of the shaft.

16. An analog to digital encoder comprising the combination of claim 15 in combination with a plurality of pulse generators equal in number to the number of cyclical electrical signals, each pulse generator having an input terminal electrically connected to one of the output terminals of the means for producing electrical signals and an output terminal and producing a chain of pulses responsive to the frequency and phase of the electrical signal impressed on the input terminal thereof.

17. A photoelectric shaft angle encoder comprising the combination of claim 15 wherein the means for generating two cyclical wave outputs responsive to rotation of the shaft comprises a code disc mounted coaxially on the shaft for rotation therewith, said disc having a circular track disposed thereon coaxially about the shaft having a plurality of transparent sectors of equal arc length separated by opaque sectors of equal arc length, a light source disposed on one side of the code disc for illuminating the disc, and two light responsive transducers disposed confronting different portions of the track on the side of the disc opposite the light source.

18. An analog to digital shaft angle encoder comprising the combination of claim 15 wherein the means for producing more than two cyclical electrical signals comprises a first group of resistor electrically connected at one end to one input terminal of the means for producing more than two cyclical electrical signals, each of said resistors of the first group being electrically connected at the other end to a different output terminal of said means, and a second group of resistors electrically connected at one end of the second input terminal of said means, each of the resistors of said second group of resistors being electrically connected to a different output terminal of said means, at each output terminal of said means the resistor of the first group and the resistor of the second group mixing the two cyclical electrical waves of the generating means to produce a potential having a phase angle between that of the two cyclical electrical waves.

19. An analog to digital shaft angle encoder comprising the combination of claim 15 wherein the two cyclical waves generated by the means responsive to rotation of the shaft differ in phase by an angle no greater than 90 degrees and wherein the means for producing more than two cyclical electrical signals comprises a first group of resistors electrically connected at one end to one input terminal of the means for producing more than two cyclical electrical signals, each of said resistors of the first group being electrically connected at the other end to a different output terminal of said means, a phase inverter having an input terminal electrically connected to the other input terminal of said means and an output terminal, and a second group of resistors equal in number to one less than the number of output terminals, each of said resistors being electrically connected at one end to a different output terminal and some of said second group of resistors being electrically connected at the other end to the other input terminal of said means, the remainder of said resistors of the second group being electrically connected at the other end to the output terminal of the phase inverter, and the phase angle of the signals on the output terminals of said means differing in phase from each other by 180 degrees divided by the number of output terminals.

20. An analog to digital shaft angle encoder comprising the combination of claim 15 wherein each of the pulse generators comprises a trigger circuit having a triggering threshold at the positive-negative transition of the input electrical signal thereto.

References Cited

UNITED STATES PATENTS

| | | | |
|---|---|---|---|
| 2,765,459 | 10/1956 | Winter | 340—347 |
| 2,845,710 | 8/1958 | Claret et al. | 33—1 |
| 3,028,589 | 4/1962 | Broadwell | 340—347 |
| 3,403,392 | 9/1968 | Wogatzke | 340—347 |
| 3,420,600 | 1/1969 | Mevers et al. | 250—199 X |

MAYNARD R. WILBUR, Primary Examiner

G. R. EDWARDS, Assistant Examiner

PO-1050
(5/69)

UNITED STATES PATENT OFFICE
CERTIFICATE OF CORRECTION

Patent No. 3,509,562 Dated April 28, 1970

Inventor(s) Ralph Hafle

It is certified that error appears in the above-identified patent and that said Letters Patent are hereby corrected as shown below:

Column 1, line 47, Change "counts" to --count--.

Column 6, line 29, After "as a" insert --result of--.

After "combining" insert --a--.

Column 6, lines 73-75, "the square wave $Z_{36}$ and the inverse of this square wave trigger circuit 240 which produces on one output terminal the square wave $X_{36}$ and the inverse of this square wave" should read --the sine wave $Y_{36}$ is impressed on the input of a second trigger circuit 240 which produces on one output terminal the square wave $Z_{36}$ and the inverse of this square wave--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents